United States Patent [19]

Goedecke

[11] Patent Number: 4,490,623
[45] Date of Patent: Dec. 25, 1984

[54] WIND MOTOR MACHINE

[76] Inventor: Alfred Goedecke, Pasinger. Str. 27a, D-1000 Berlin 49, Fed. Rep. of Germany

[21] Appl. No.: 440,580

[22] Filed: Nov. 10, 1982

[51] Int. Cl.³ .............................................. F03D 3/04
[52] U.S. Cl. ..................................... 290/55; 415/2 R
[58] Field of Search ................................... 290/44, 55; 415/2 R–4 R

[56] References Cited

U.S. PATENT DOCUMENTS 3,883,261 5/1975 Saxmann ............................. 415/3 R

FOREIGN PATENT DOCUMENTS 3003270 8/1981 Fed. Rep. of Germany ..... 415/2 R
2492468 4/1982 France .................................. 290/44

Primary Examiner—S. J. Witkowski
Assistant Examiner—Shelley Wade

[57] ABSTRACT

An improved wind motor machine having a wind rotor rotatable about a vertical axis. The rotor core body of the machine is provided with convexly curved wind application surfaces and coacting outer wing bodies having load supporting airplane wing-shaped cross-sections. The efficiency of the machine is improved by means of stream guiding bodies disposed in the intermediate space between the rotor core body and the wing bodies. These stream guiding bodies extend in a desired streaming direction, that is normal to the rotational axis of the wind body, which insures substantially laminar air streaming within the intermediate space.

15 Claims, 7 Drawing Figures

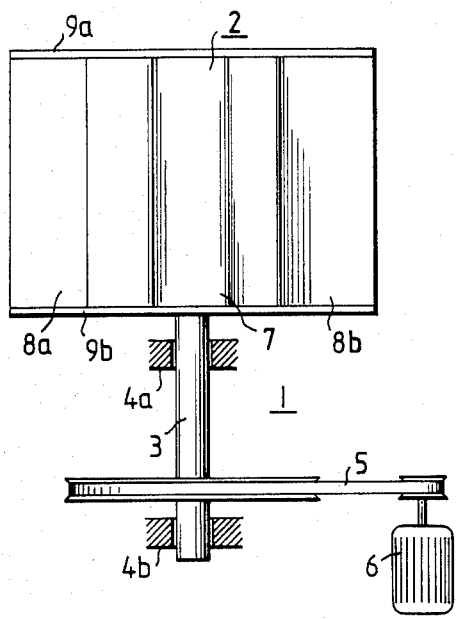
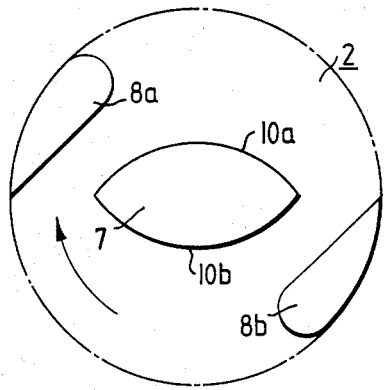
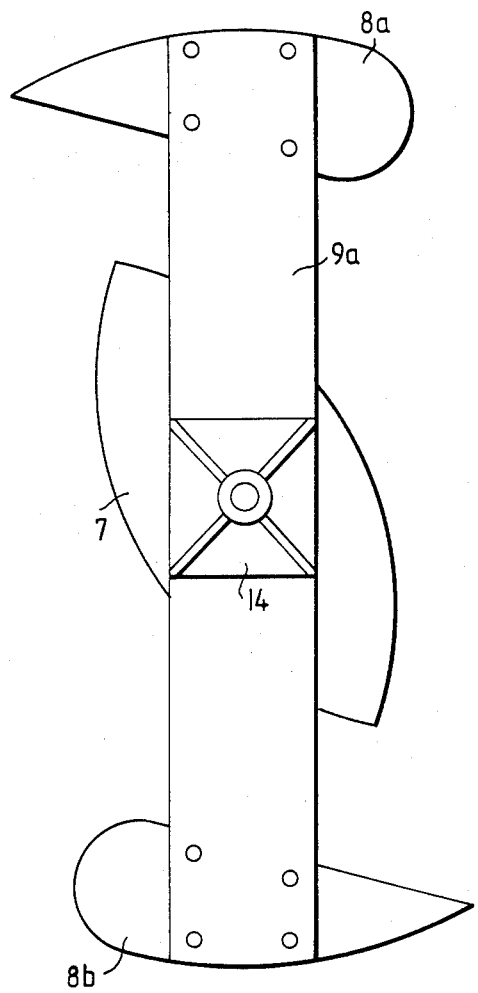

WIND MOTOR MACHINE

BACKGROUND OF THE INVENTION

This invention relates to wind motor machines but more particularly to a wind motor machine having a wind rotor which is rotatable about a vertical axis.

In the art, there are wind motor machines that have a wind rotor rotatably mounted about a vertical axis in which the rotor core body is provided with convex curved wind application surfaces and which has thereto appurtenant exterior wing bodies. Such a wind motor machine is described in German published application DE-OS 30 03 270. This wind motor machine is a further development of a wind motor machine which is described in German patent No. DE-PS 604 333. In this known wind motor machine, a middle body, surrounded by wings, rotates; thereby the middle body has a particular curved-like profiled shape. It produces an alternating effect by means of a pair of arranged wings, wherein the wings guide in an accelerating manner the air stream. The wings support themselves by the driving effect of the middle body in a guide vane-like manner. Despite the fact that so-shaped wind rotors have a vertical axis of rotation, it has nevertheless a so-called "dead angle", which means that there are two positions in which the wind rotor does not self-start when the wind begins to blow from a predetermined direction.

The apparatus taught in the above-mentioned German published application (No. 30 03 270) provides a wind motor machine having a vertical axis of rotation with which the wind rotor of any size can be started independent of the wind direction and from any position without any foreign energy source. There also are not required any type of mechanical adjusting means.

SUMMARY OF THE INVENTION

It is an object of the present invention to provide a wind motor machine whose manner of operation is improved.

It is another object of the present invention to provide a wind motor machine which prevents the formation of non-laminar air streaming (turbulence) in the machine.

It is a further object of the present invention to provide a wind motor machine that will operate satisfactorily in wind or strong storm conditions.

It is another object of the present invention to provide a wind motor machine whose manner of operation is made more efficient by wind conditions which impinge on the wind motor machine in the form of non-laminar air streaming.

It is yet another object the present invention to provide a wind rotor machine operating in restless air streaming to be loaded as little as possible by means of vibrating forces resulting from non-laminar air streaming.

It is yet still another object of the present invention to provide a wind motor machine having a wind rotor with increased strength and rigidity.

It is another object of the present invention to provide a wind motor machine having a wind rotor rotatable about a vertical axis, wherein the wind rotor body has a rotor core body with convex curved wind application surfaces and thereto arranged outer wing bodies which have substantially airplane wing-shaped cross sections, and which are characterized by the fact that for the air which streams during operation through the intermediate space disposed between the wing body and the rotor core body, there is provided a stream guiding body for hindering streaming components in the direction of the rotational axis of the wind rotor.

It is another object of the present invention to provide a wind motor machine having a wind rotor rotatable about a vertical axis, wherein the wind rotor body has a rotor core body with convex curved wind application surfaces and thereto arranged outer wing bodies which have substantially airplane wing-shaped cross sections, and which are characterized by the fact that in the intermediate space between the rotor core body and the wing body there extends at least one stream guiding body which is secured to at least one or both wind rotor bodies, the rotor core and wing bodies.

It is another object of the present invention to provide a wind motor machine of the type referred to hereinabove, characterized by the fact that the stream guiding body is arranged normally with respect to the rotational axis of the wind rotor.

It is another object of the present invention to provide a wind motor machine of the aforedescribed type, characterized by the fact that the stream guiding body limits the intermediate space in the axial direction.

It is another object of the present invention to provide a wind motor machine of the aforedescribed type, characterized by the fact that the stream guiding body joins the rotor core body with the wing body.

It is another object of the present invention to provide a wind motor machine of the aforedescribed type, characterized by the fact that the stream guiding body is of laminar-shaped construction.

It is another object of the present invention to provide a wind motor machine of the aforedescribed type, characterized by the fact that the stream guiding body is made out of sheet metal.

It is another object of the present invention to provide a wind motor machine of the aforedescribed type, characterized by the fact that a plurality of stream guiding bodies are provided in the intermediate space.

It is another object of the present invention to provide a wind motor machine of the aforedescribed type, characterized by the fact that the mutual distance between the two first mutually adjoining stream guiding bodies differentiates itself from the distance between two second mutually adjoining stream guide bodies.

It is another object of the present invention to provide a wind motor machine of the aforedescribed type, characterized by the fact that the stream guiding body extends also outside of the region forming the intermediate space.

It is another object of the present invention to provide a wind motor machine of the aforedescribed type, characterized by the fact that the stream guiding body extends into regions wherein the streaming produces a pressure head.

Briefly, the invention describes a wind motor machine having a wind rotor rotatable about a vertical axis, the rotor core body of which is provided with convex curved wind application surfaces and coacting outer wing bodies having load supporting airplane wing-shaped cross sections. The efficiency is improved by means of stream guiding bodies disposed in intermediate spaces between the rotor core body and wing bodies. These steam guiding bodies extend in the desired streaming direction, which is normal to the rotational axis of the wind rotor insuring substantial laminar air streaming within the intermediate space.

BRIEF DESCRIPTION OF THE DRAWINGS

FIG. 1 is a side-elevational view of a wind motor machine of the prior art, as disclosed in Applicant's German patent, cited above, having a wind rotor rotatable about a vertical axis.

FIG. 2 is a cross-sectional view through the wind rotor depicted in FIG. 1 at a random selected level.

FIG. 3 is a constructional plan view of the wind rotor depicted in FIG. 1 for the stiff mounting of the rotor core body and the thereto arranged wing bodies of a wind rotor.

DETAILED DESCRIPTION OF THE PREFERRED EMBODIMENTS

Figure 4:
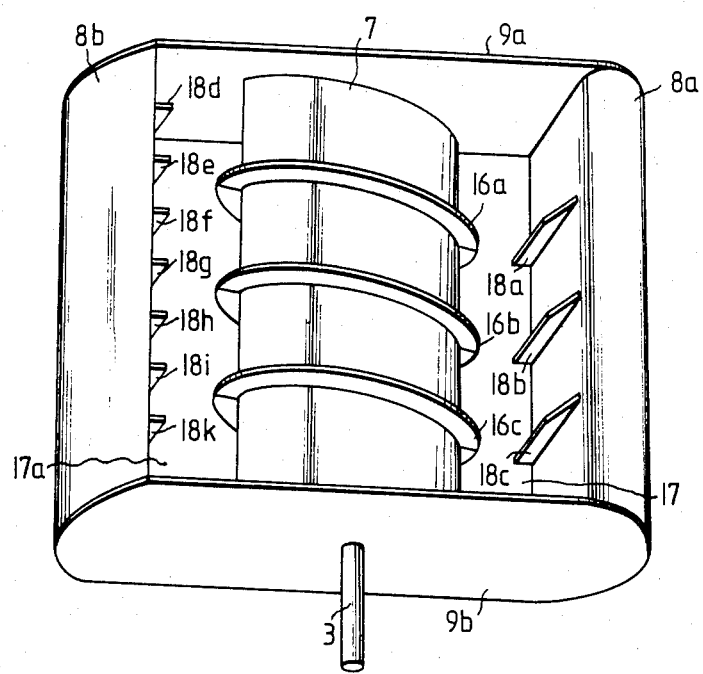
FIG. 4 is a prospective view of the improved wind motor machine of the present invention, having stream guiding bodies.

In FIG. 1, the wind motor machine is shown generally at 1 with its main components. The wind rotor 2, which is rotatable about a vertical axis is provided with a vertical shaft 3 which is rotatably mounted in two bearing supports 4a and 4b. A belt drive 5 is provided between the bearing supports 4a and 4b allowing a generator 6 to be driven by the wind rotor 2. The wind rotor 2 consists of a wind rotor body, in particular a rotor core body 7 and wing bodies 8a and 8b which are rigidly joined to each other, for example, by means of plate-like stream guiding bodies 9a and 9b. Depending on the operational requirements, the number of bearing supports can be increased. The construction can be insubstantially otherwise modified in the sense of the invention in dependence with prevailing conditions or circumstances. For example, with larger dimensions for the wind rotor 2, an upper and lower band support can be provided or a rigid shaft can be used to mount the wind rotor 2; also a support plate which simultaneously serves the belt drive 5 or operates without an intermediary disposed belt and is directly connected to the generator 6, supported on the end plate 9a, respectively 9b, can afford a similar modification. With larger dimensions there is the weight problem and therefore the wind rotor body is made preferably hollow, in particular the rotor core body 7. The generator 6 or the corresponding mechanically driven agregate, a pump, a grinding mechanism or the like can be mounted within the hollow rotor core body 7. In such case the aforementioned embodiment having a fixed shaft is preferred.

Referring to FIG. 2, the rotor core body 7 has exteriorly curved wind application surfaces 10a, 10b with which there is arranged an outer load-bearing wing body 8a, 8b having substantially airplane wing-shaped cross sections. The rotational direction of the wind rotor 2 is illustrated by means of the arrow. Independently from the wind direction, the wind rotor starts from any position and delivers immediate energy by means of which, at a reduced number of rotations, there is at least provided an excitation voltage for the generator 6. The characteristic of this wind rotor to self-start resides in the shape of the individual wind application surfaces and the position of the wind rotor body 7 and wing body 8a, respectively 8b, with respect to each other. The thereto streaming air between the wing body 8a, respectively 8b, and the rotor core body 7, rotating in the wind, accelerates the therethrough streaming air so that at the rotor core body 7 there appears an outwardly acting force having a component in the rotational direction. The wind impinging on the portion of the rotor body 7 which is not overlapped by the passing wing body 8a, respectively 8b, presses on the portion of the wind application surface 10a, respectively 10b, of the rotor body 7 which moves away, thereby also supporting the force component acting in the rotational direction. One can observe with randomly different positions of the wind rotor 2 at predetermined wind directions at all times force components acting in the rotational direction, causing rotational movement, contributing a plurality of simultaneous useful effects, for example, drive, deviation, pressure head, suction due to turbulence, etc.

The size of the rotor in accordance with the invention is only limited by consideration of strength but not as a result of the self-adjusting streaming conditions. It does not appear to be in this periphery a "dead angle".

In FIG. 3 the wind rotor body consists of mounting a plate 14 on the upper and lower side of the wind rotor 2 and on the corresponding stream guiding body 9a and 9b which is securely mounted on the corresponding plate 14. The wing bodies 8a and 8b can thereby be securely mounted against rotation in a simple manner in their mutual positions and in the position relative to the rotor core body 7 rotating therewith. In case of wind rotor 2 of larger sizes, which are rotatable about a stationary shaft, the co-rotating bearing parts can be directly mounted on the plate 14.

In FIG. 4 the wind motor machine has a rotational core body 7 with three rotating, laminar-shaped streaming guiding bodies 16a, 16b, 16c. These bodies also extend into the intermediate space 17 located between the rotational core body and a wing body 8a so as to extend toward the stream guiding bodies 18a, 18b, 18c, which are mounted on the wing body 8a. The stream guiding bodies extend in the desired streaming direction, that is normal to the rotational axis of the wind rotor. In particular, in that region where the impinging air accumulates, the stream guiding bodies 16a, 16b, 16c and 9a, 9b, insure, that the air cannot stream upwardly and/or downwardly, but is forced in a laminar stream through the intermediate space 17. In the event, the guided air arrives in the intermediate space 17, possibly in an undesirable turbulent condition, then the stream guiding bodies 18a, 18b, 18c insure a calming of the streaming.

Figure 5:
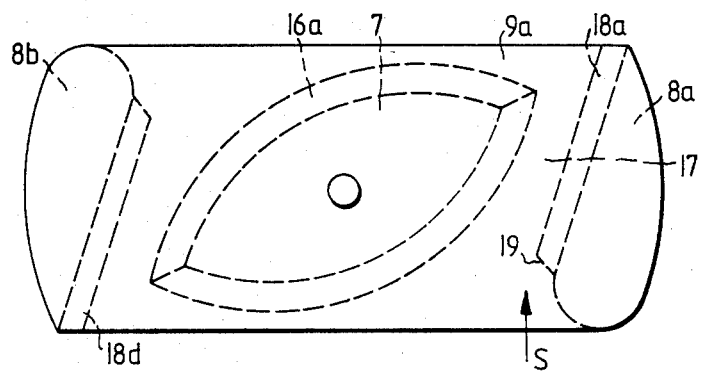
FIG. 5 is a plan view of the improved wind motor machine shown in FIG. 4.

In FIG. 5 the stream guiding bodies 18a, 18b, and 18c slope 19 in the streaming direction S. Thereby there is prevented a fluttering of the laminar-shaped stream guiding bodies.

Figure 6:
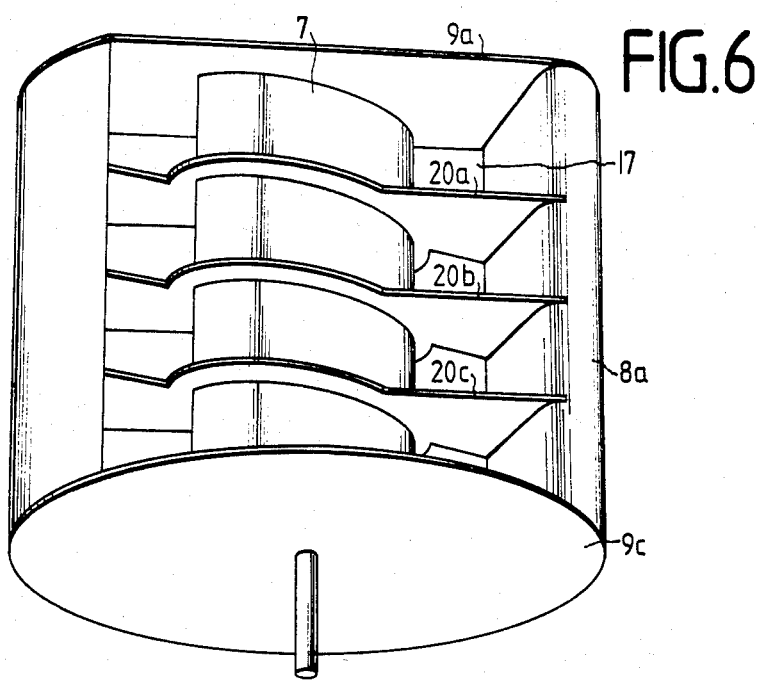
FIG. 6 is a prospective view of a further embodiment of the improved wind motor machine of the present invention, with stream guiding bodies.
Figure 7:
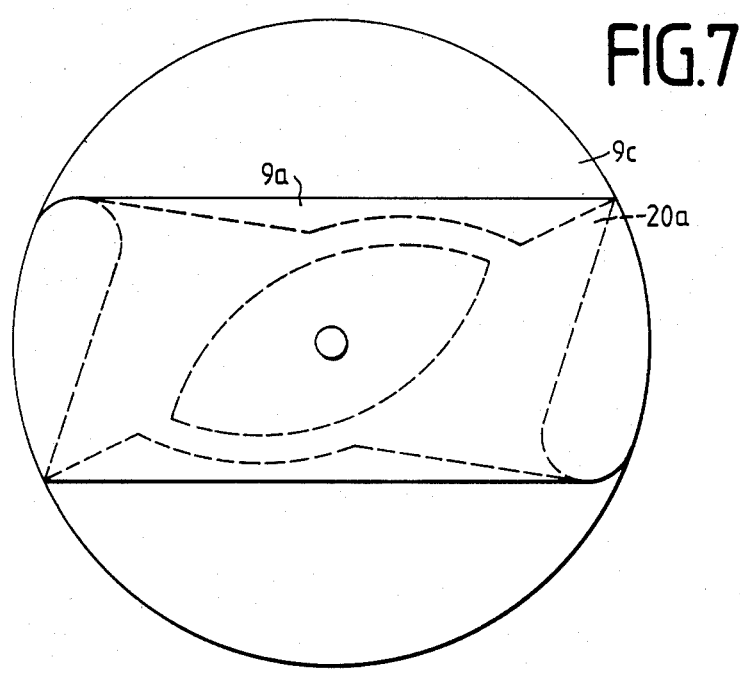
FIG. 7 is a plan view of the improved wind motor machine shown in FIG. 6.

The wind rotor according to FIGS. 6 and 7 is particularly suitable for wind squalls, when non-laminar air streams occur. The particularly large surface of the stream guiding bodies 20a, 20b, 20c, which join the rotor core body 7 with the wing body 8a insure even more that the air streaming is calm in the intermediate space 17 and occurs substantially laminarly. The stream guiding bodies 20a, 20b, 20c increase the stability of the arrangement. This allows for modification in which the stream guiding body 9c which closes the intermediate space in the axial direction, does not jointly rotate with the wind rotor but remains stationary. This can be advantageous when the stream guiding body 9c serves anywhere as a base plate.

The stream guiding bodies are preferably made out of sheet metal, synthetic material, or water-resistent glue wood layers. The number of stream guiding bodies 18d to 18k, arranged on the wing body 8b can differ from the number of guiding bodies 18a to 18c arranged on the rotor core body 7. Correspondingly, the distance between the mutually adjoining stream guiding bodies within the intermediate space 17a can also be different.

Although the invention is illustrated and described with reference to a plurality of preferred embodiments thereof, it is to be expressly understood that it is in no way limited to the disclosure of such preferred embodiments but is capable of numerous modifications within the scope of the appended claims.

I claim:

1. An improved wind motor machine having a wind rotor rotatable about a vertical axis the wind rotor body having a rotor core body with convex curved wind application surfaces and thereto arranged outer load-bearing wing bodies having substantially airplane wing-shaped cross sections, wherein the improvement comprises that in the intermediate space between said rotor core body and said wing body there extends at least one stream guiding body which is secured to at least one of said wind rotor core body and wing bodies.

2. An improved wind motor machine, as in claim 1, wherein the improvement further comprises that said stream guiding body is arranged normal with respect to the rotational axis of the wind rotor.

3. An improved wind motor machine, as in claim 1, wherein the improvement further comprises that said stream guiding body limits the intermediate space in the axial direction.

4. An improved wind motor machine, as in claim 1, wherein the improvement further comprises that said stream guiding body joins said rotor core body with said wing body.

5. An improved wind motor machine, as in claim 1, wherein the improvement further comprises that said stream guiding body is of laminar shape construction.

6. An improved wind motor machine, as in claim 5, wherein the improvement further comprises that said stream guiding body is made out of sheet metal.

7. An improved wind motor machine, as in claim 1, wherein the improvement further comprises that the mutual distance between two first mutually adjoining said stream guiding bodies differentiates itself from the distance between two second mutually adjoining said stream guiding bodies.

8. An improved wind motor machine, as in claim 5, wherein the improvement further comprises that said stream guiding body extends also outside of the region forming said intermediate space.

9. An improved wind motor machine, as in claim 8, wherein the improvement further comprises that said stream guiding body extends into regions wherein the streaming produces a pressure head.

10. An improved wind motor machine having a wind rotor rotatable about a vertical axis, the wind rotor body having a rotor core body with convex wind application surfaces and thereto arranged outer load-bearing wing bodies having substantially airplane wing-shaped cross sections, wherein the improvement comprises that in the intermediate space between said rotor core body and said wing body there extends at least one laminar-shaped stream guiding body arranged normal with respect to the rotational axis of the wind rotor, and which is secured to at least one of the said wind rotor core body and wing bodies.

11. An improved wind motor machine, as in claim 10, wherein the improvement further comprises that said stream guiding body limits the intermediate space in the axial direction.

12. An improved wind motor machine as in claim 10, wherein the improvement further comprises that said stream guiding body joins said rotor core body with said wing body.

13. An improved wind motor machine, as in claim 10, wherein the improvement further comprises that the mutual distance between two first mutually adjoining stream guiding bodies differentiates itself from the distance between two second mutual adjoining stream guiding bodies.

14. An improved wind motor machine as in claim 10, wherein the improvement further comprises that said stream guiding body extends also outside of the region forming said intermediate space.

15. An improved wind motor machine as in claim 14, wherein the improvement further comprises that said stream guiding body extends into regions wherein the streaming produces a pressure head.

* * * * *